April 19, 1927.
G. T. POLLARD
1,625,564
TRANSMISSION GEAR
Filed April 15, 1926
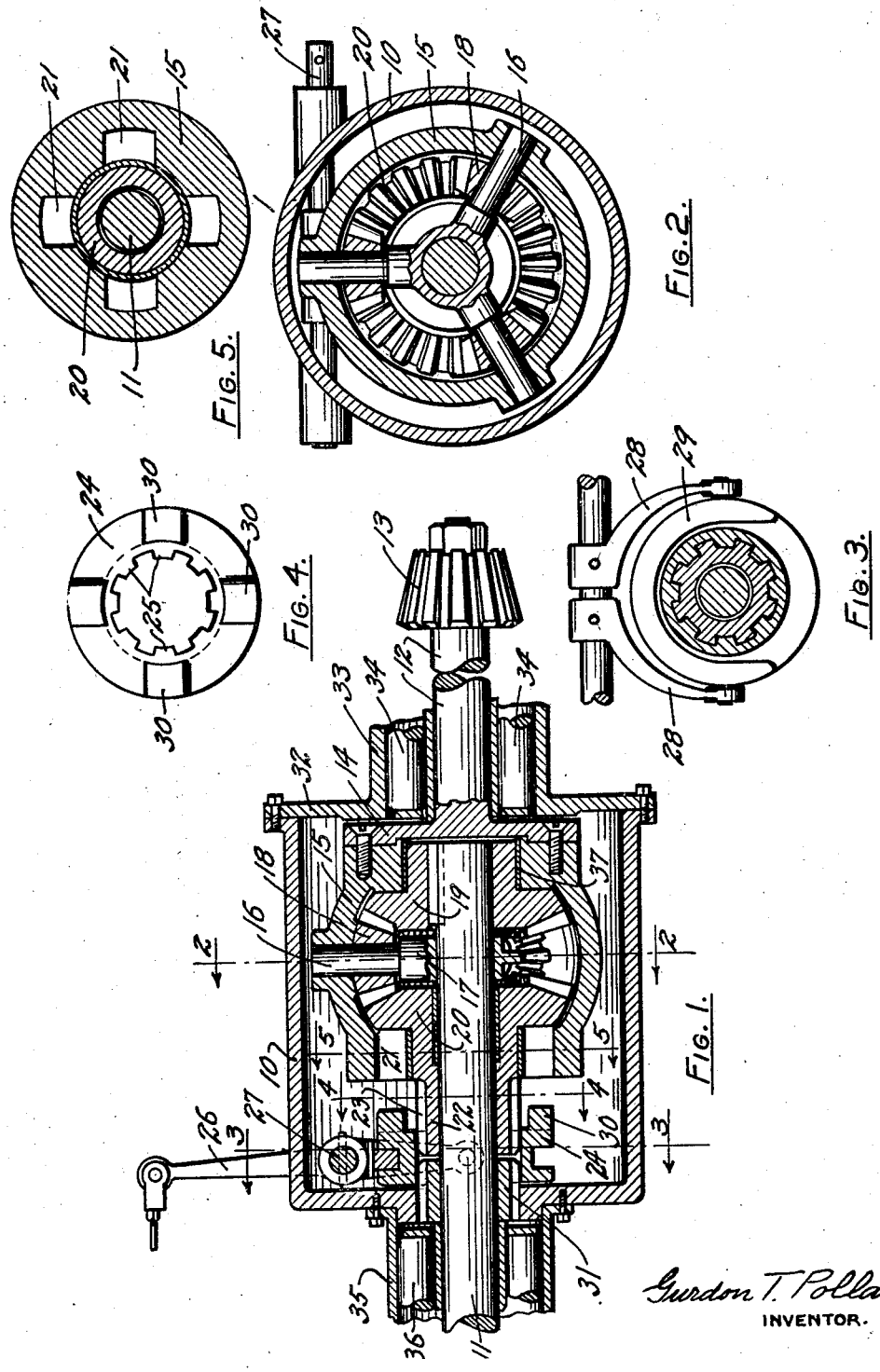
Gurdon T. Pollard
INVENTOR.

Patented Apr. 19, 1927.

1,625,564

UNITED STATES PATENT OFFICE.

GURDON T. POLLARD, OF DENVER, COLORADO.

TRANSMISSION GEAR.

Application filed April 15, 1926. Serial No. 102,172.

This invention relates to improvements in transmission gears of the auxiliary type, to be installed in an automobile, between the rear axle housing and the regular transmission gear, thereby making additional gear ratio available.

The principal object of my invention is to provide a small, light and cheap auxiliary transmission.

Another object is to provide such a transmission which, because of its small size, will necessitate very little shortening of the propeller shaft, and because of its light weight, will put very little additional strain upon the rear axle housing.

Still another object is to provide such a transmission in which the gears are always in mesh, and in which the usual high drive position is entered by the operation of a jaw clutch which locks all gears and housing into a revolving unit, which drives straight through without gear friction.

A further object is to provide such a transmission in which the gears are always in mesh, and in which the low speed reduction position of clutch locks one gear to the outer drive shaft housing, and transmission takes place from the inner drive shaft through differential gears to transmission housing which is rigidly attached to the driven shaft.

Further objects, features and advantages will more clearly appear by the following description, taken in connection with the accompanying drawing, which forms a part hereof. Like numerals refer to like parts in all views of the drawing and throughout the description.

In the drawing:

Fig. 1 is a longitudinal section through my improved transmission mechanism.

Fig. 2 is a cross section of the same, taken on the line 2—2, Fig. 1.

Fig. 3 is a detail cross section, taken on the line 3—3, Fig. 1.

Fig. 4 is an elevation of the clutch member looking as on the line 4—4, Fig. 1.

Fig. 5 is a similar cross section, taken on the line 5—5, Fig. 1.

The invention comprises a gear case 10, in which terminate, a drive shaft 11 and a driven shaft 12. The shafts 11 and 12 form the propeller shaft of the automobile and transmit power from the regular automobile transmission to the differential gear on the rear axle, the differential pinion being shown at 13.

The shaft 12 terminates in a face plate 14 which carries a planet gear support 15. The planet gear support 15 carries the extremities of a series of radial shafts 16 which project from a spider 17 rotatably carried on the shaft 11. Upon the shafts 16 a series of planet bevel gears 18 are carried.

On the extremity of the shaft 11, a sun gear 19 is fixed, which engages with all of the planet gears 18. The opposite side of the planet gears 18 is engaged by a free sun gear 20 rotatably mounted on the shaft 11. The planet gear support 15 is provided with recesses 21 at its free extremity.

The free sun gear 20 has an elongated hub 22, upon which external teeth 23 are formed. A clutch 24, having internal gear teeth, 25, is slidably mounted on the hub 22 with the teeth 23 and 25 in engagement. The clutch 24 is actuated through the medium of a clutch lever 26, clutch operating shaft 27, clutch forks 28, and clutch yoke 29. The latter rides in the usual groove in the clutch 24. The clutch 24 is also provided with projections 30, arranged to engage the recesses 21 on the planet gear support 15.

When the clutch is in the position shown in Fig. 1, the internal teeth 25 thereof are in engagement with the teeth 23 of the hub 22 and with teeth formed on a stationary shaft collar 31, pressed into the gear case 10. The shaft collar 31 may, if desired, be made a part of the gear case 10. When the clutch is in this position, the free sun gear 20 is prevented from rotating and the rotation of the shaft 11 will be transmitted through the medium of the sun gear 19 to the planet gears 18 which in traveling around the stationary gear 19 will impart a rotative motion to the planet gear support 15 and the shaft 12. This motion is in the same direction of rotation of the shaft 11. The shaft 12, however, rotates at one-half the speed of the shaft 11.

By shifting the clutch 24 to the right until it disengages the collar 31, the transmission is brought into the "neutral" position, that is, rotation of the shaft 11 will impart no rotation whatever to the shaft 12 since the power of the sun gear 19 is expended in rotating the free sun gear 20 about the shaft 11 through the medium of the planet gears 18.

By shifting the clutch 24 still further to the right until the projections 30 engage the recesses 21 of the planet gear support 15, the transmission will be brought into the direct drive or "high" position. In this position, the clutch rotates with the planet gear support 15 which, in turn, rotates the free sun gear 20 so that all of the members move with the shaft 11, the planet gears 18 being locked against rotation about the shafts 16. In this position, the shaft 12 turns at the same speed and in the same direction as the shaft 11.

The gear case 10 is closed at one extremity, through which the mechanism is inserted, by a cap 32 which carries a shaft housing 33 in which roller bearings 34 support the shaft 12. The shaft housing 33 may be an extension of the regular differential housing of the automobile. At the other extremity of the gear case 10, a shaft housing 35 is secured, carrying roller bearings 36 for the support of the shaft 11. The extremity of the shaft 11 is supported in a bearing bushing 37 in the planet gear support 15.

The shaft 11 has been herein described as a "drive shaft" and the shaft 12 as a "driven shaft", this however may be reversed in practice and the shaft 12 made the drive shaft, where it is desired to have the transmission act as a speed increaser.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A transmission mechanism for transmitting power from a first shaft to a second shaft comprising a member secured to the extremity of said second shaft and extending around the extremity of said first shaft; planet gears carried in said member; a gear carried on said first shaft adapted to engage said planet gears; means for causing said planet gears to selectively rotate either around or with said first shaft, said means comprising a sun gear rotatably mounted on said first shaft and maintained in engagement with said planet gears; and means adapted to cause said sun gear to rotate with said member or remain stationary as desired, said means comprising a rigid support; a toothed clutch slidably carried on said sun gear and arranged to rotate therewith, said clutch having means for engaging said member or engaging said rigid support at will.

2. Means for transmitting power from a first shaft to a second shaft comprising a member fixed to the extremity of said second shaft and adapted to surround the extremity of said first shaft; planet gears carried by said member; a fixed sun gear on the extremity of said first shaft in engagement with said planet gears; a free sun gear arranged to rotate on said first shaft in engagement with the opposite sides of said planet gears; a rigid support for both said shafts; means for locking said free sun gear either to said rigid support or to said member as desired, said means comprising a clutch; internal teeth on said clutch; external teeth on said support; external teeth on said free sun gear; and external teeth on said clutch adapted to engage recesses in said member; and means for sliding the internal teeth of said clutch along the external teeth on both said support and said free sun gear.

In testimony whereof I affix my signature.

GURDON T. POLLARD.